June 30, 1970      V. ZSILINSZKY      3,518,006
PENDULUM HEIGHT FINDER FOR USE WITH STEREOSCOPIC
AERIAL PHOTOGRAPHS
Filed April 27, 1967      3 Sheets-Sheet 1

*INVENTOR*
V. ZSILINSZKY

Douglas S. Johnson
*Attorney*

June 30, 1970  V. ZSILINSZKY  3,518,006
PENDULUM HEIGHT FINDER FOR USE WITH STEREOSCOPIC
AERIAL PHOTOGRAPHS
Filed April 27, 1967  3 Sheets-Sheet 2
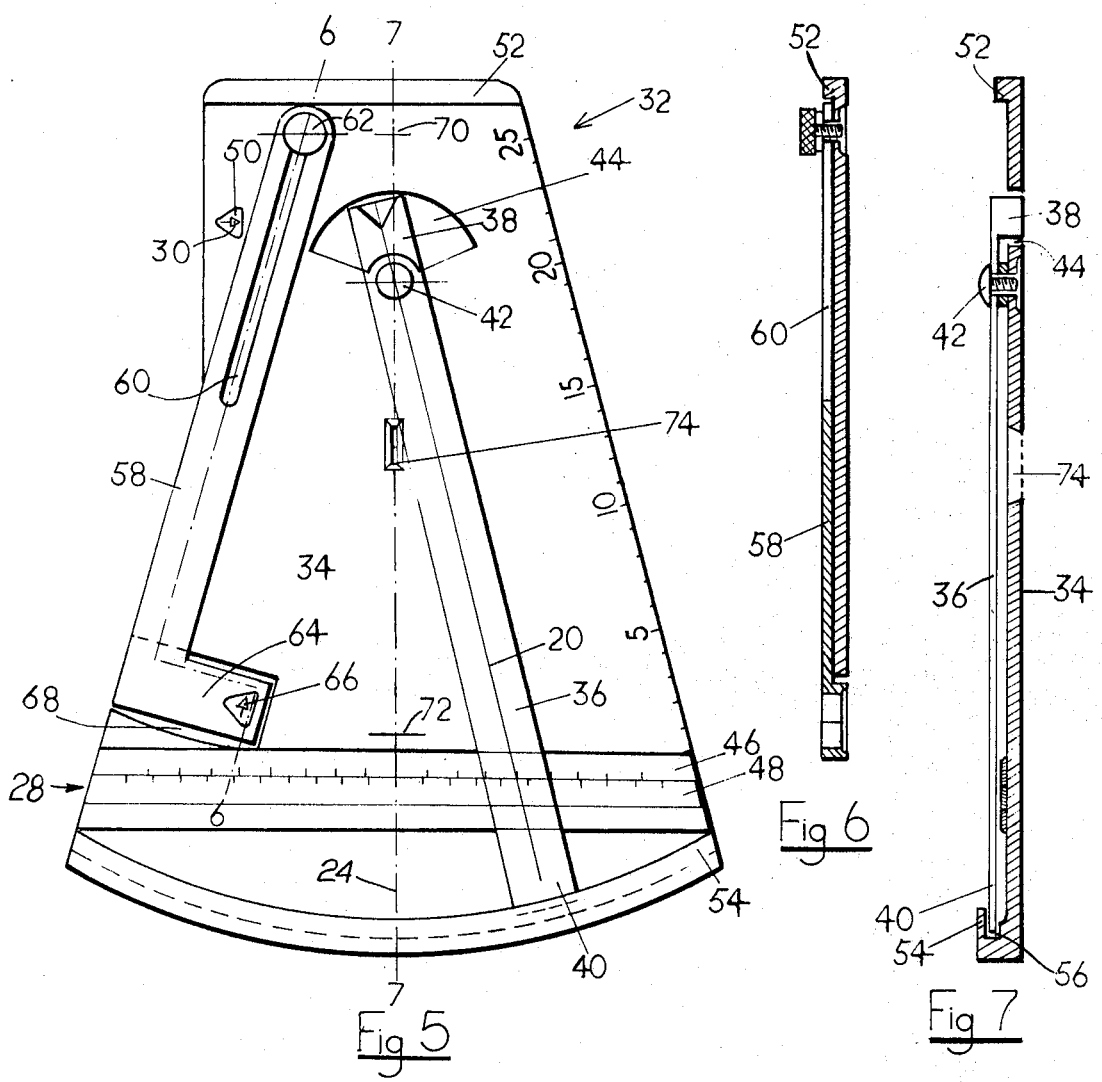
Fig 5
Fig 6
Fig 7
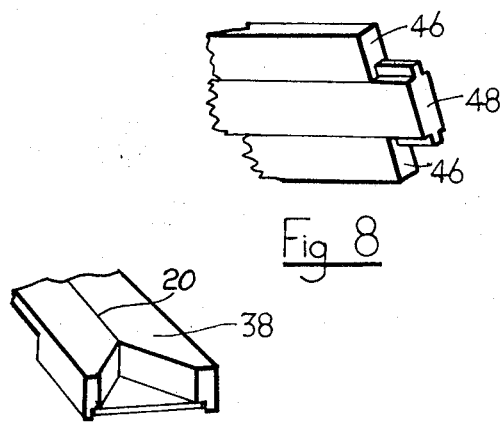
Fig 8
Fig 9
INVENTOR
V. ZSILINSZKY
Douglas S. Johnson
Attorney United States Patent Office 3,518,006
Patented June 30, 1970

3,518,006
PENDULUM HEIGHT FINDER FOR USE WITH STEREOSCOPIC AERIAL PHOTOGRAPHS
Victor Zsilinszky, 154 Keele St. N., King City, Ontario, Canada
Filed Apr. 27, 1967, Ser. No. 634,153
Int. Cl. G01b 3/14; G01c 11/06
U.S. Cl. 356—138      5 Claims

ABSTRACT OF THE DISCLOSURE

An instrument for measuring the parallax of an object on a stereoscopic pair of aerial photographs formed of a plate having a pendulum pivoted intermediate of its ends, the pendulum having a line passing through the pivot point, with one end of the line moving over a scale on the plate. An index mark formed of an arrow is positioned on the plate adjacent the other end of the line, the approximate distance away of the human eye base. The parallax of the object is determined by rotating the pendulum when viewed by a lens stereoscope to the position where the line fuses with the arrow, the parallax being then measured by the reading on the scale where it is intersected by the line.

BACKGROUND OF THE INVENTION

Field of the invention

The invention is a photogrammetric instrument. Its purpose is to measure heights on stereoscopic aerial photographs.

Description of the prior art

For quick and approximate height measurement on three dimensional aerial photographs, devices have been developed to measure the parallax of a stereoscopic image. All these devices use the stereoscopic effect of a floating mark—conventionally a dot visualized in space—over the three dimensional model. The best device of this type—the parallax bar—has an optimum reading accuracy of 0.01 millimetre, which is obtained by the proper setting of a micrometer.

However, the operation of such an instrument requires highly sensitive and skilled stereoscopic perception to be able to accurately perceive the spacial location of the floating mark. Most people lack the patience to acquire the necessary skill; consequently, many avoid the necessary exercise that is required at the outset to master this type of instrument. Also the conventional height-finder lacks stability when in use. When the micrometer is turned, the whole unit slips over the stereoscopic pair, resulting in a Y-parallax and which needs immediate readjustment.

The floating mark on these devices is usually fairly large, so that it can be easily seen on the stereoscopic model. But the apparent diameter of the floating mark may obscure detail on the stereoscopic model where height measurements are to be obtained.

Both the lens and mirror stereoscopes require a different size of conventional height-finder.

In addition to the conventional height-finder, the complete procedure of stereoscopic height measurements requires a ruler with a millimetre or inch scale.

It is an object of the invention to provide a method and apparatus which will enable the height of an object on stereoscopic aerial photographs to be determined without the development of highly sensitive stereoscopic perception by the viewer when using a lens or mirror stereoscope.

BRIEF DESCRIPTION OF THE DRAWINGS

The invention will now be described in relation to the accompanying drawings, wherein:

FIG. 5 is a plan view of one embodiment of apparatus according to the invention;
FIG. 6 is a section taken on the lines 6—6 of FIG. 5;
FIG. 7 is a section taken on the lines 7—7 of FIG. 5;
FIG. 8 is a perspective view of the mounted slide-rule;
FIG. 9 is a perspective view of the measuring head of the pendulum.

DESCRIPTION OF THE PREFERRED EMBODIMENT

Figure 1:
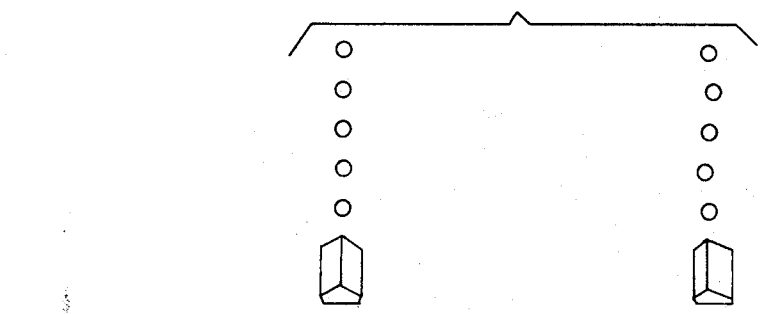
FIG. 1 is a stereogram illustrating the displacement of images.

The major difficulty in seeing the floating mark stereoscopically at a specific elevation may be totally overcome by intersecting for instance the point of an arrow with a beam at that specific elevation in the stereo model. While the special determination of a point requires the stereoscopic "feel" of the floating mark in order to bring it to the exact altitude of that point, the intersection of the point of an arrow with a beam on the spot in question in the stereo model is no harder to do than transferring a principal point to the adjacent air photo with the aid of a stereoscope. For background information, FIG. 1 shows a stereogram to illustrate the principle of parallax measurement. Five circles of the same size in a vertical row and the image of a building produce a stereoscopic effect if the left image is viewed by the left eye and the right image with the right eye. In stereoscopic inspection it becomes obvious that the first, third and fifth circles be in one plane, while the second circle floats below and the fourth one floats above that plane. In monocular viewing it is apparent that the first, third and fifth circles of the stereogram are parallel, while the second circle—in the right row—is shifted to the right and the fourth is shifted to the left. Also, the ridge of the building roof is displaced in relation to its base as it is seen when viewed from two different points. So it may be said that in a stereoscopic model, between two images of the same point or object, the longer the distance the lower the elevation, or the shorter the distance the higher the elevation. If the distance is measured between two images of a point or object, parallax is the result; if the difference is calculated between two parallaxes—for example, the top and bottom of a building—the result is the differential parallax, and this is the first critical factor to be measured on aerial photographs in order to obtain height.

Therefore, since a parallax is determined by means of distance measurement simply by accurately locating identical points on the two images of a stereoscopic pair, the stereoscopic use of a floating mark can be replaced by a simpler method that can be mastered immediately by anyone who has only a normal degree of stereoscopic perception. This new method retains reading accuracy and greatly reduces the highly varying human error of the best type of conventional devices.

Figure 2:
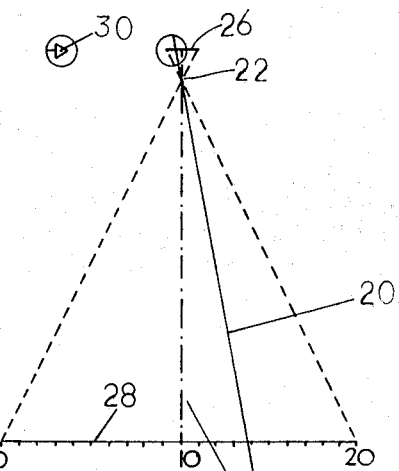
FIG. 2 is a diagrammatic representation of the invention.

The invention is illustrated diagrammatically in FIG. 2. A linear indicia 20 is shown to pivot about a point 22.

An axis 24 traverses the point 22, the axis 24 being normal to a scale 26 spaced from but adjacent to the point 22. The line 20 extends in one direction from the point 22 over the scale 26 and in the other direction traverses another scale 28, the position of which is conveniently selected to be ten times that of the distance from the point 22 as compared with the scale 26. Accordingly, it will be appreciated that the difference in two positions indicated on the scale 26 by intersection of the line 20 will be enlarged ten times on the scale 28. An arrow 30 is placed in a stationary position against the scale 26 in an approximate distance of the human eye base. If this arrangement of the pivoting line 20, scale 26 and the arrow 30 is set on a stereoscopic pair of photographs so that the tip of the arrow 30 is placed on the part of an object, the parallax of which needs to be determined, with the scale 26 parallel to the line of coincidence of the left and right images of that selected part of an object of the stereo pair, then on stereoscopic fusion of the pivoted line 20 with the tip of the arrow 30, the intersection of the line 20 on the scale 28 provides a measurement of parallax.

Figure 3:
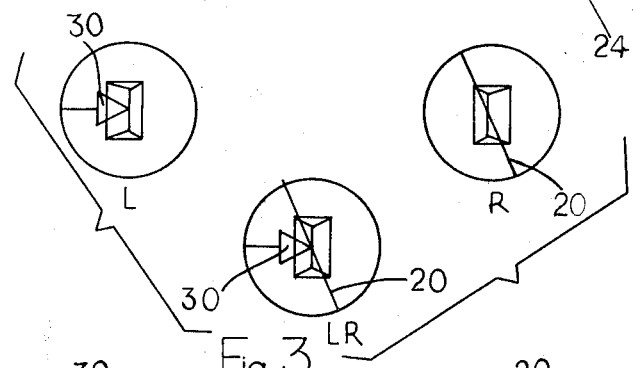
FIG. 3 is a stereogram and a combination of two images as seen stereoscopically when the parallax of a roof-top is being measured.
Figure 4:
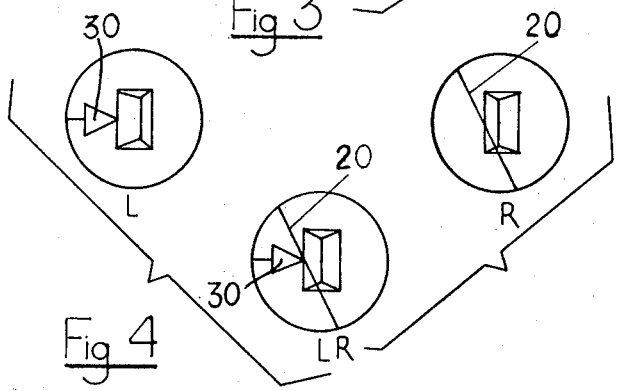
FIG. 4 is the same as FIG. 3, except the intersection of the point of an arrow with a line is set to measure the parallax of the roof edge.
Figure 10:
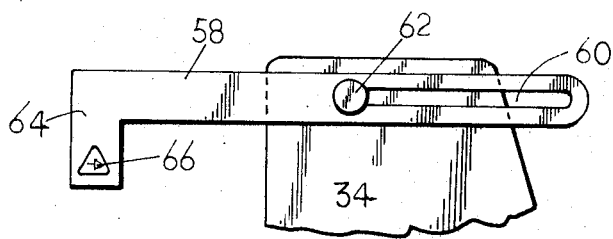
FIG. 10 shows the working position of the attachment for a mirror stereoscope.

For example, FIGS. 3 and 4 illustrate the parallax measurement with the invention. The L and R diagrams form one stereogram that may be viewed with the aid of a lens stereoscope to acquire a three dimensional effect. The LR diagram at the centre is the monocular expression of the stereoscopically viewed L and R. In order to measure the height of an object from aerial stereo pairs, the parallax of both the top and the bottom must be determined. First, in FIG. 3, the parallax of the roof-top of a building is measured by intersecting the point of arrow 30 with pivoting line 20 on the ridge line; then an accurate parallax reading is taken from scale 28. Next, the point of arrow 30 and the pivoting line 20 are intersected at the roof-edge; parallax measurement is taken again from scale 28. The subtracted difference between the two obtained parallaxes, which is the differential parallax, is the primary purpose of any height-finding device. The differential parallax is inserted in a well known formula which gives height.

FIGS. 5, 6 and 7 illustrate a preferred form of apparatus utilizing the method of the invention described above. The apparatus, generally denoted by the numeral 32, includes a plate 34 which is preferably made of transparent plastic material. A pendulum member 36, also preferably made of similar material, is pivoted intermediate its ends 38 and 40, on the plate 34 by means of a threaded bolt 42. In the preferred form of the pendulum member 36 and as illustrated more particularly in FIGS. 7 and 9, the end 38 is thicker than the main body of the pendulum member 36. The end 38 is located in an arcuate slot 44 provided in the plate 34. The end 38 may be lowered into the arcuate slot 44 by tightening the bolt 42 until the under surface of the end 38 is just touching the face of the photograph.

A scale 28 is provided on the plate 34, the scale 28 being normal to the axis 24 of the plate 34 with the axis 24 traversing the bolt 42.

In the preferred embodiment shown in FIG. 8 the scale 28 is inscribed on one arm of a channel member 46 secured by means such as adhesive to the plate 34. A vernier 48 co-operatively slides in well known manner within the channel member 46 to provide a higher degree of accuracy of measurement.

A member 50 carrying the arrow 30 is slidably located in the plate 34 so that the member 50 may be lowered in the plate 34 until its undersurface is just touching the face of the photograph. The arrow 30 is located the approximate distance of the human eye base away from the end 38 of the pendulum member 36. The plate 34 has a ledge 52, the edge of which is parallel to the scale 28. The plate 34 also has an overhanging abutment 54 on the side of the scale 28 removed from the bolt 42.

The abutment 54 provides a slot 56 in which rides the end 40 of the member 36 which extends over the scale 28.

As shown in FIG. 5 the pendulum member 36 has the linear indicia 20 inscribed or inset thereon, the linear indicia 20 extending to the end 38 and also over the scale 28.

Figure 11:
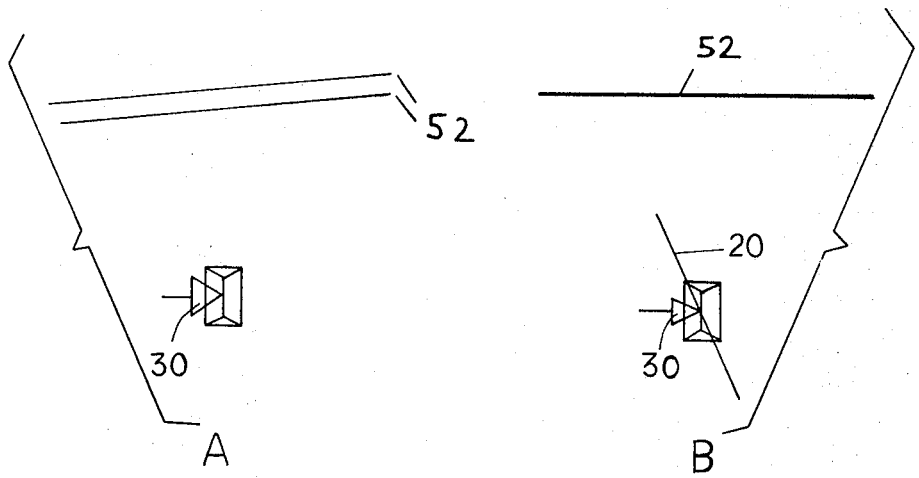
FIG. 11 illustrates the step of aligning the apparatus on stereo pair so that the left and right eye images of the ledge of the apparatus, as shown on the left hand side, are fused into a single line as shown on the right hand side.

To measure the parallax of an object on a stereo pair of photographs which are positioned in relation to each other so that the principal and conjugate principal points are in alignment it is necessary to superimpose the apparatus 32 on the stereo pair viewing them through a lens stereoscope. The arrow 30 is positioned so that it touches a selected part of the object, e.g. the roof-top, the height of which has to be determined. The apparatus 32 is then rotated about the arrow 30 until the left and right images of the ledge 52 optically fuse, as illustrated in FIG. 11, at which position the apparatus 32 is properly aligned. The pendulum member 36 is rotated until fusion takes place of the linear indicia 20 and the arrow 30, the scale reading denoted by the intersection of the linear indicia 20 with the scale 28 being noted, movement of the vernier 48 giving, of course, a high degree of accuracy of the parallax reading.

To adapt the apparatus 32 for use with a mirror stereoscope an additional member 58 is employed, as illustrated in FIG. 5, which has a slot 60 extending from one end. The member 58 is located on the plate 34 by means of a releasable bolt 62 threaded into the plate 34 adjacent the ledge 52. The other end of the member 58 removed from the slot 60 has an arm 64 directed towards the axis 24. An arrow 66 is inset on the arm 64, the arrow 66 being directed in a plane parallel to the member 58. A recess 68 is provided in the plate 34 to locate the arm 64 when the member 58 is not in use.

The apparatus 32 is used in conjunction with a mirror stereoscope by releasing the threaded bolt 62 and rotating the member 58 until it lies parallel to the ledge 52; to ensure this position the bolt 62 is positioned a distance away from the ledge 52 just sufficient to accommodate one of the bifurcated arms of the member 58 which forms the slot 60. The next step is to align the position of the arrow 66, now directed normally to the axis 24 with the apparent situation of the linear indicia 20 inset on the member 36.

Two cross marks 70 and 72 are provided on the axis 24 of the plate 34. Positioned also on the axis 24 at a point equi-distant from the cross marks 70 and 72 is a slot 74 in the plate 34. First, the cross marks 70 and 72 are aligned with the vertical fiducial marks on each photograph of the stereo pair, and through slot 74 a pencil mark is made; secondly, cross marks 70 and 72 are aligned with the horizontal fiducial marks, and the same procedure is carried out. The result is that the principal point may thus be conveniently and precisely located on both photographs, each principal point is then transferred to the adjacent photo of the stereo pair and the distance between the principal point and the transferred conjugate principal point on each photograph is measured. The average of these two measurements is the photo base which is the second factor to be measured on aerial photographs in order to obtain the height of an object by means of a well known formula.

Fiducial marks are permanent marks in the focal plane of all photogrammetric cameras in order to determine the principal point of each photograph. The fiducial marks are located usually at the side centres in the frame of each photograph. Straight lines drawn across the fiducial marks intersect each other where the principal point is located.

While certain embodiments have been illustrated and described for the purpose of disclosure, it will be understood that the invention is not limited thereto, but contemplates such modifications and other embodiments as may be utilized without departing from the invention.

I claim:
1. Apparatus for measuring the parallax of an object shown on an aerial stereo pair of photographs comprising a transparent plate, a transparent pendulum pivoted on said plate adjacent one end of said pendulum, the other end of said pendulum moving over a scale on said plate, said pendulum having linear indicia over said scale and beyond said pivot towards said one end, an index mark on said plate positioned the distance of the human eye base away from said linear indicia extending beyond said pivot and means on said plate for alignment thereof on said stereo pair, the parallax of said object being determined by placing said plate on said stereo pair with said index mark on a selected point of said object and measuring the position of said linear indicia on said scale due to movement of said pendulum to obtain stereoscopic fusion when observed by a lens stereoscope of said index mark with said linear indicia beyond said pivot.

2. Apparatus according to claim 1 wherein said means for alignment is a linear abutment on said plate parallel to said scale and removed from one end of said pendulum.

3. Apparatus according to claim 2 having a slotted member on said plate pivotally movable and slidable along said slot to a position where an edge of said member bears against said linear abutment, an index mark at one end of said member, said index mark in said position on said slotted member being aligned with the apparent situation of said linear indicia on said pendulum adjacent said one end of the said aerial stereo pair as viewed with a mirror stereoscope.

4. Apparatus according to claim 3 wherein a pair of cross marks are provided on said plate on a line normal to said linear abutment and extending through said pivot, said cross marks being spaced apart a distance corresponding to that between a pair of opposed fiducial marks on an aerial stereo photograph and an aperture in said plate equidistant between said cross marks for determining the principal point position of each of said aerial photographs.

5. Apparatus according to claim 3 wherein each of said index marks has an arrowhead.

References Cited

UNITED STATES PATENTS

| | | |
|---|---|---|
| 1,910,425 | 5/1933 | Cahill. |
| 2,813,339 | 11/1957 | Schlatter. |
| 2,842,846 | 7/1958 | Rabben. |
| 2,859,520 | 11/1958 | Meijer. |
| 2,894,327 | 7/1959 | Schatzley et al. |
| 3,136,060 | 6/1964 | Hackman. |

OTHER REFERENCES

Oblique height finder, No. 750, Union Instrument Corporation, 3/55.

RONALD L. WIBERT, Primary Examiner

J. ROTHENBERG, Assistant Examiner

U.S. Cl. X.R.

33—1(A); 356—71